US005256092A

United States Patent [19]

Jones

[11] Patent Number: 5,256,092

[45] Date of Patent: Oct. 26, 1993

[54] CARBURETOR-ADJUSTING ACCESSORY HARNESS FOR PERSONAL JET-PROPELLED WATERCRAFT

[76] Inventor: Donald J. Jones, 3500 Edgecliff, Farmington, N. Mex. 87402

[21] Appl. No.: 865,323

[22] Filed: Apr. 8, 1992

[51] Int. Cl.[5] .............................................. B60K 41/00

[52] U.S. Cl. ...................................... 440/87; 114/270; 261/71

[58] Field of Search ...................... 440/38, 87, 84, 77; 123/344; 251/293, 294; 261/DIG. 38, 71

[56] References Cited

U.S. PATENT DOCUMENTS

| | | | |
|---|---|---|---|
| Re. 5,977 | 7/1874 | Welham | 464/52 |
| Re. 8,607 | 3/1879 | Stow | 464/52 |
| 46,166 | 1/1865 | Welham | 464/52 |
| 1,925,991 | 9/1933 | Shaw | 464/52 |
| 2,004,918 | 6/1935 | Mitchell | 250/20 |
| 2,287,674 | 6/1942 | Fairbanks | 237/1 |
| 2,368,457 | 1/1945 | Eisenbeis | 464/52 |
| 3,238,808 | 3/1966 | Barnard | 464/52 |
| 3,369,518 | 2/1968 | Jacobson | 440/38 |
| 3,444,701 | 5/1969 | Randolph | 464/52 |
| 3,721,208 | 3/1973 | Lampert et al. | 115/6.1 |
| 4,094,932 | 6/1978 | Kox, Sr. | 261/DIG. 38 |
| 4,348,976 | 9/1982 | Gilbert | 114/270 |
| 4,416,644 | 11/1983 | Kulischenko et al. | 464/52 |
| 4,810,216 | 3/1989 | Kawamura | 440/2 |
| 4,844,650 | 7/1989 | Zapusbek et al. | 403/197 |
| 4,969,847 | 11/1990 | Curtis et al. | 440/77 |
| 5,080,618 | 1/1992 | Dunham et al. | 440/77 |

*Primary Examiner*—Edwin L. Swinehart

*Attorney, Agent, or Firm*—Kenton L. Freudenberg; Maxwell C. Fruedenberg

[57] ABSTRACT

A readily mountable and removable carburetor-adjusting control harness accessory for use with a jet-propelled personal watercraft having a deck with a top engine compartment opening and a hood in sealed engagement with the deck at the periphery of the compartment opening to prevent entry of water into the Compartment, the harness having at least one coaxial structure comprising an outer casing and an inner flexible rotatable but non-twistable shaft, one end of the casing of each coaxial structure being in sealed relationship between the hood and the deck with that one end extending to the outside of the compartment when the compartment is closed by the hood, the inner shaft of each said structure extending throughout the length of the respective casing and beyond the ends of the casing, the outer manually accessible end of each shaft having a manually rotatable knob thereon for remote adjustment of a carburetor adjusting member on the other end of the shaft, a bracket structure for anchoring the carburetor end of each casing relative to a carburetor structure in said compartment to hold each said carburetor adjusting member in engagement with a respective carburetor-adjusting needle valves to adjust the valves by rotation of the knobs. Alternatively, the outer end of the coaxial harness structures may extend through an access opening in the hood and be removably attached to the hood surface. The configuration of the coaxial structures may be changed by heating the casings in boiling water, shaping them and then cooling them.

20 Claims, 6 Drawing Sheets

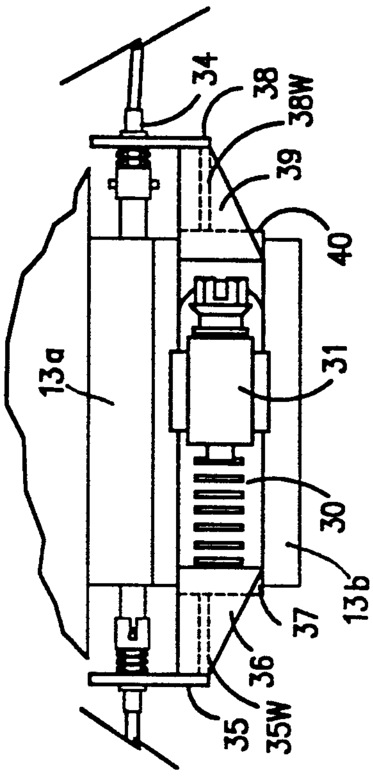
FIG. 9
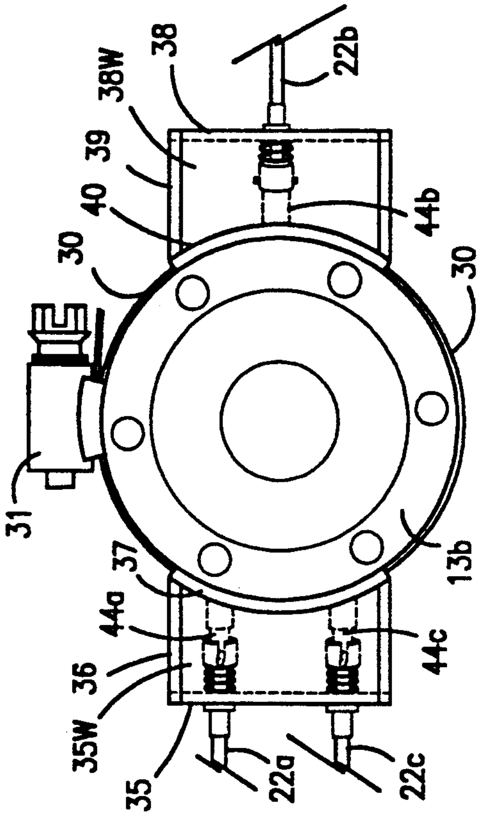
FIG. 11
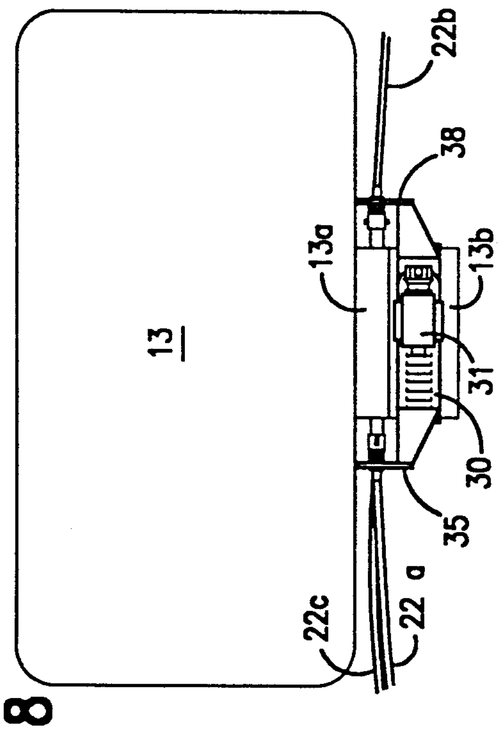
FIG. 8
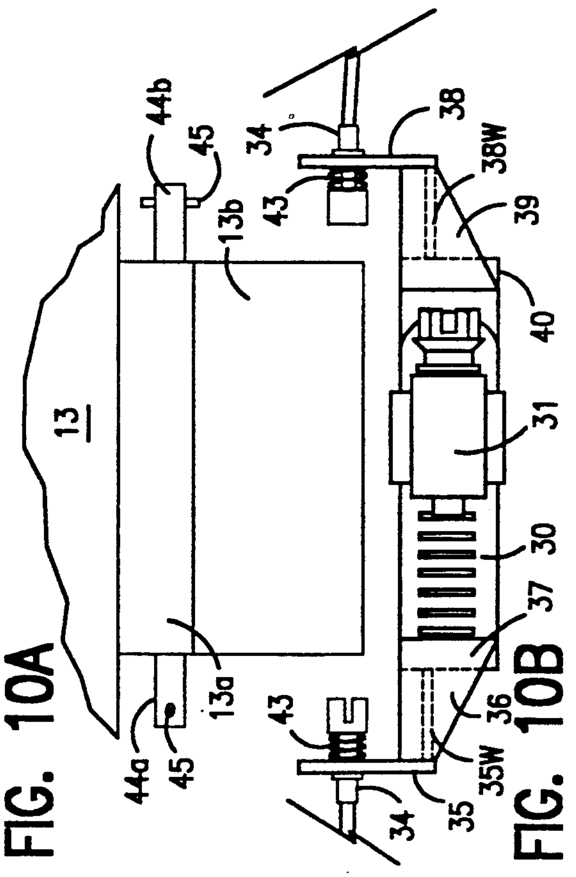
FIG. 10A
FIG. 10B

Fig. 21
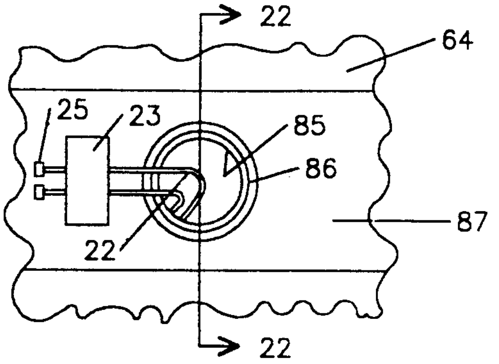
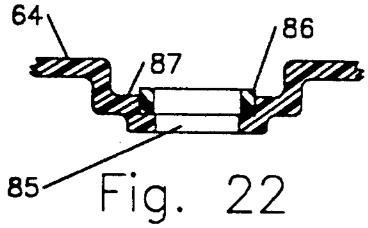
Fig. 22
Fig. 23
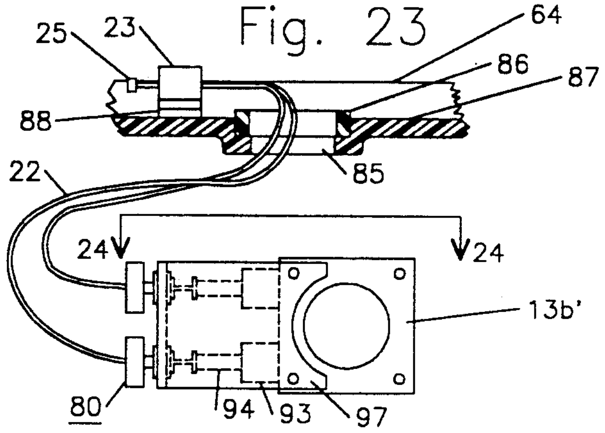
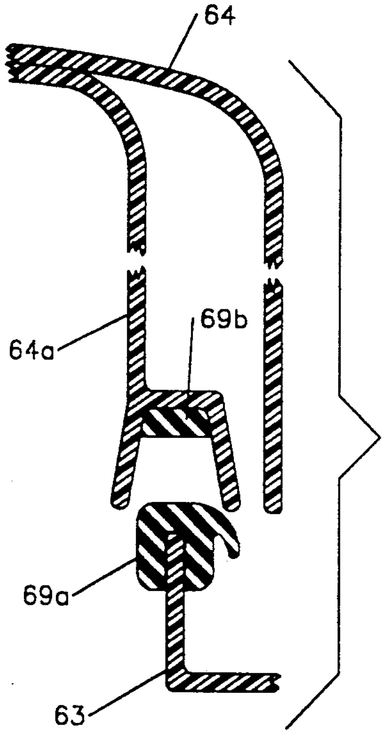
Fig.20
Fig. 24
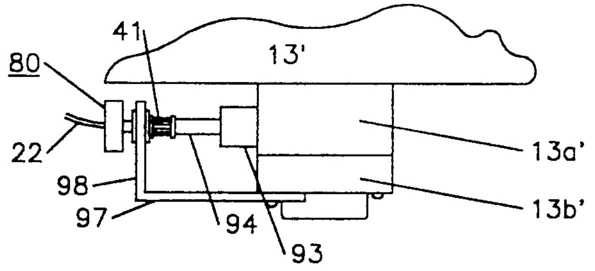
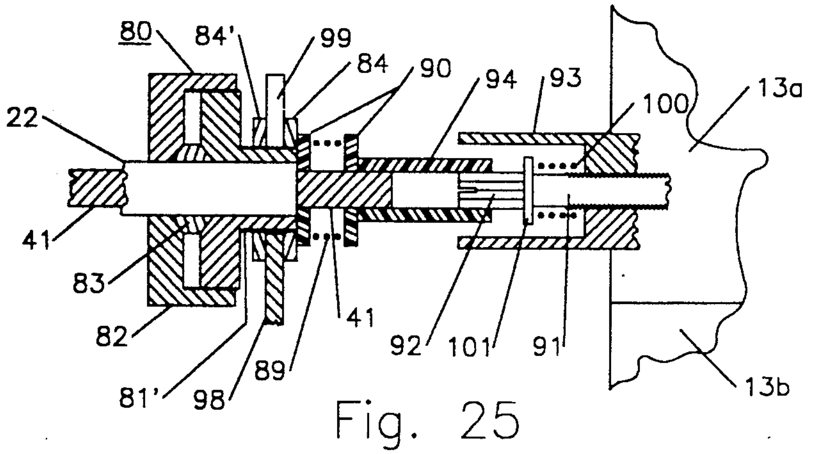
Fig. 25

CARBURETOR-ADJUSTING ACCESSORY HARNESS FOR PERSONAL JET-PROPELLED WATERCRAFT

BACKGROUND OF THE INVENTION

This invention relates to accessory carburetor-adjusting apparatus for fine tuning the engine operation of a personal jet-propelled watercraft while the watercraft is in the water at a race site and immediately preceding a racing or other competition event to obtain optimum engine performance under existing fuel and environmental conditions. Although the invention is particularly useful at competitive events, it is also important for the average recreational user to have his engine optimally tuned for quick throttle response during conventional maneuvers to avoid hesitations in engine operation which can often lead to instabilities and capsizing.

Fine tuning of the engine carburetion system over the range of throttle selections expected to be used during the competition is necessary for a variety of reasons, including: the high degree of competition in a variety of types of watercraft competitive events and the need for quick throttle response in dynamic abrupt maneuvers such as are performed in slalom and freestyle events; a variety of different geographical competition locations and related variations in altitude and seasonal temperature and humidity; and variations in the available gasoline and oil to be mixed as fuel for the watercraft engine. The classes of competition, such as those promoted by the International Jet Sports Boating Association, tend to equalize the competitors as far as the hardware requirements are concerned, i.e., the boats and engines may be essentially identical, so it is left to the prowess of the operator to have the engine optimally tuned and then optimally operate the watercraft to achieve victory in competition.

Typical off-the-shelf watercraft for recreational activities and various competitive categories have an engine compartment which is covered by a removable hood having a watertight sealed interface with the deck to preclude the entry of water into the engine area, and the tuning adjustments of the carburetor require removal of the hood to access manually adjustable needle valves on the carburator. The number of needle valves may vary and in connection with the preferred embodiment of the invention described herein the carburetor-adjusting accessory example may be used to adjust three such needle valves.

SUMMARY OF THE INVENTION

The present invention provides a quickly mountable and removable carburetor-adjusting harness which can be secured between the removable engine compartment hood and the deck of a watercraft and has a plurality of manual controls, readily accessible at the exterior of the hood during operation of the watercraft. A corresponding plurality of coaxial control cable structures operatively interconnect the manual controls and respective needle valves on the carburetor. Each coaxial control cable structure has an outer relatively rigid tubular sheath or casing having one end anchored at a watertight sealed interface between the hood and the deck and a second end supported by a bracket anchored at and in fixed relationship to the carburetor. Each manual control at the exterior of the hood is a rotatable knob secured to the exterior end of a flexible inner shaft extending through the tubular casing. The other end of the flexible inner shaft extends from the second end of the casing toward a respective needle valve on the carburetor and is coupled to that needle valve so that rotation of the exterior manual control knob effects rotational adjustment of the needle valve. The needle valve is typically an adjustable screw which has an outer shaft with a transverse pin extending therethrough. A cup with axial slots and secured on the carburetor end of the flexible inner shaft fits over the end of the valve shaft with the ends of the pin in the slots whereby the needle valve screw may be rotated for adjustment by rotation of the cup with the flexible shaft via rotation of the exterior control knob. The entire harness including the control knobs, the bracket and the valve engaging cups are easily mounted as a unit relative to the watercraft by means of releasable mounting means at the deck and releasable anchoring means at the carburetor structure on the watercraft for tuning the carburetion and are readily removed or separably released as a unit after tuning and before a competitive racing event or other recreational use. If the needle valve screw has a different driving configuration such as a transverse screwdriver slot in its end or a splined external surface, appropriate mating driving coupling means is provided on the end of the flexible shaft.

A principal object of this invention is to pi:.-)wide a carburetor adjusting mechanism for a personal jet-propelled watercraft which will enable fine tuning of the carburetor while the craft is operating afloat and unanchored in the water where it will be operated or raced and without requiring removal of the engine compartment hood while the engine is running under operator selected conventional throttle control during tuning.

Another object of the invention is to provide a carburetor tuning mechanism which can be readily mounted on a watercraft and readily removed therefrom without detrimentally affecting the sealed relationship between the engine compartment hood and the craft's deck.

A further object of the invention is to arrange a plurality of carburetor adjusting control devices in closely located relationship at a readily accessible location at the exterior of an engine compartment to facilitate carburetor tuning with one hand of the operator during operation of a watercraft, the conventional throttle control being operable with the other hand.

Still another object of the invention is to provide a carburetor-adjusting mechanism which will enable the watercraft operator to make plural adjustments at the carburetor for carburetor tuning while the operator remains at the conventional operating controls of the craft.

A further object of the invention is to provide a safer way of adjusting the carburetor on a watercraft during tuning without necessitating the reaching into the engine compartment where hot engine and exhaust components may be exposed.

Another object is to provide means to enable carburetor tuning over various operating ranges without requiring assistance of a second person and without requiring tethering of the watercraft during tuning.

DRAWINGS DESCRIPTION

FIG. 8 is a plan view of a bracket portion of the harness of FIG. 2 secured to a carburetor structure.

FIG. 9 is an enlarged view of a portion of FIG. 8.

FIGS. 10A and 10B are views similar to FIG. 9 with the parts of the harness and carburetor structure, respectively, shown separated from each other.

FIG. 11 is a side view of FIG. 9.

FIG. 20 is a section through the hood-deck sealing interface of the watercraft of FIG. 16 where the components need to be cut away for mounting cable controls in the location shown in FIG. 16.

FIG. 21 is a cutaway plan view of a modified mounting of a harness accessory on the hood of the watercraft of FIG. 16.

FIG. 22 is a section on line 22—22 of FIG. 21.

FIG. 23 is a hood section along a centerline perpendicular to line 22—22 of FIG. 21 and showing in addition components in the engine compartment where the harness is anchored.

FIG. 24 is a view on line 24—24 of FIG. 23.

FIG. 25 is an enlarged portion of FIG. 24 with some parts in section to shown details of the interconnection of a cable structure to a needle valve structure.

DESCRIPTION OF PREFERRED EMBODIMENT

Figure 1:
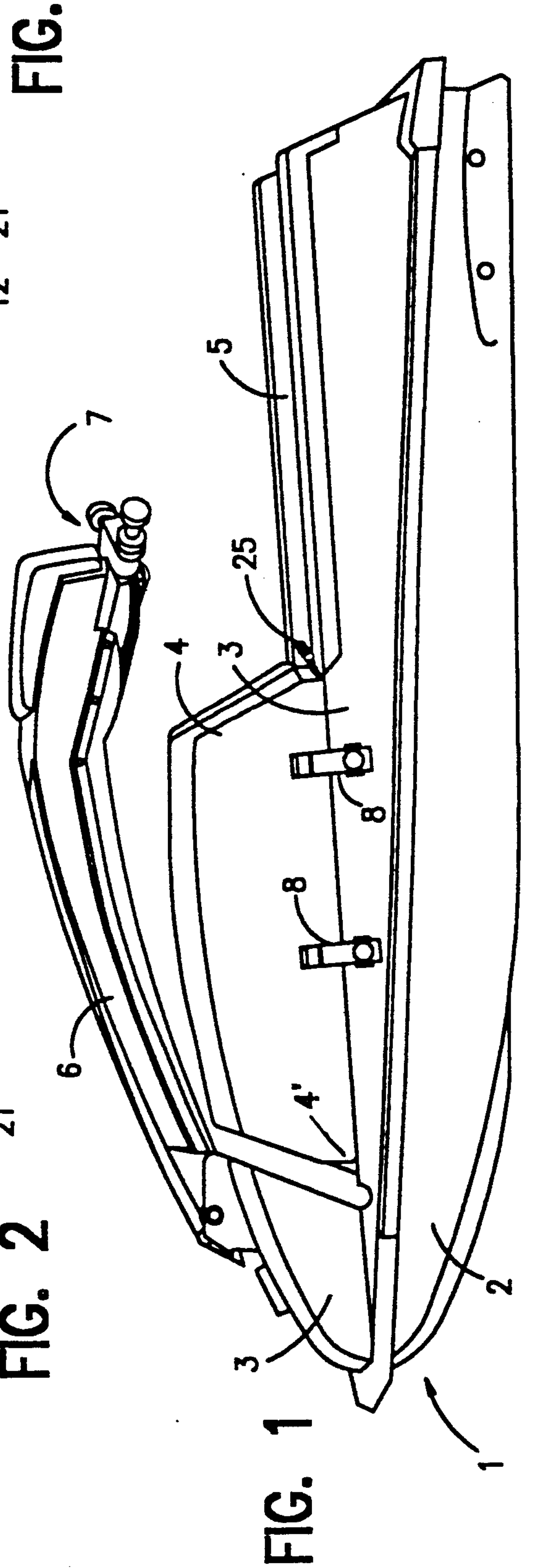
FIG. 1 is a side view of a watercraft showing the location of exterior manual carburetor-adjusting controls of the preferred embodiment relative to the deck and engine compartment hood.

FIG. 1 is a representation of a conventional personal jet-propelled watercraft 1 having a hull structure which comprises a lower portion 2 and an upper deck portion 3 and a hood 4. The deck portion 3 has an engine compartment access opening at its forward end which is covered and closed by means of the hood 4. At a rearward portion of the watercraft 1 is a tray area 5 in which the operator stands or kneels while operating the craft. Pivotably mounted at the front of the deck 3 and swingable vertically is a handle pole or steering column 6 having at its rearward end conventional steering and engine controls 7 for controlling the normal operation of the craft.

Figures 4A, 4B, 4C, 4D, 5, 6, 6A, 7:
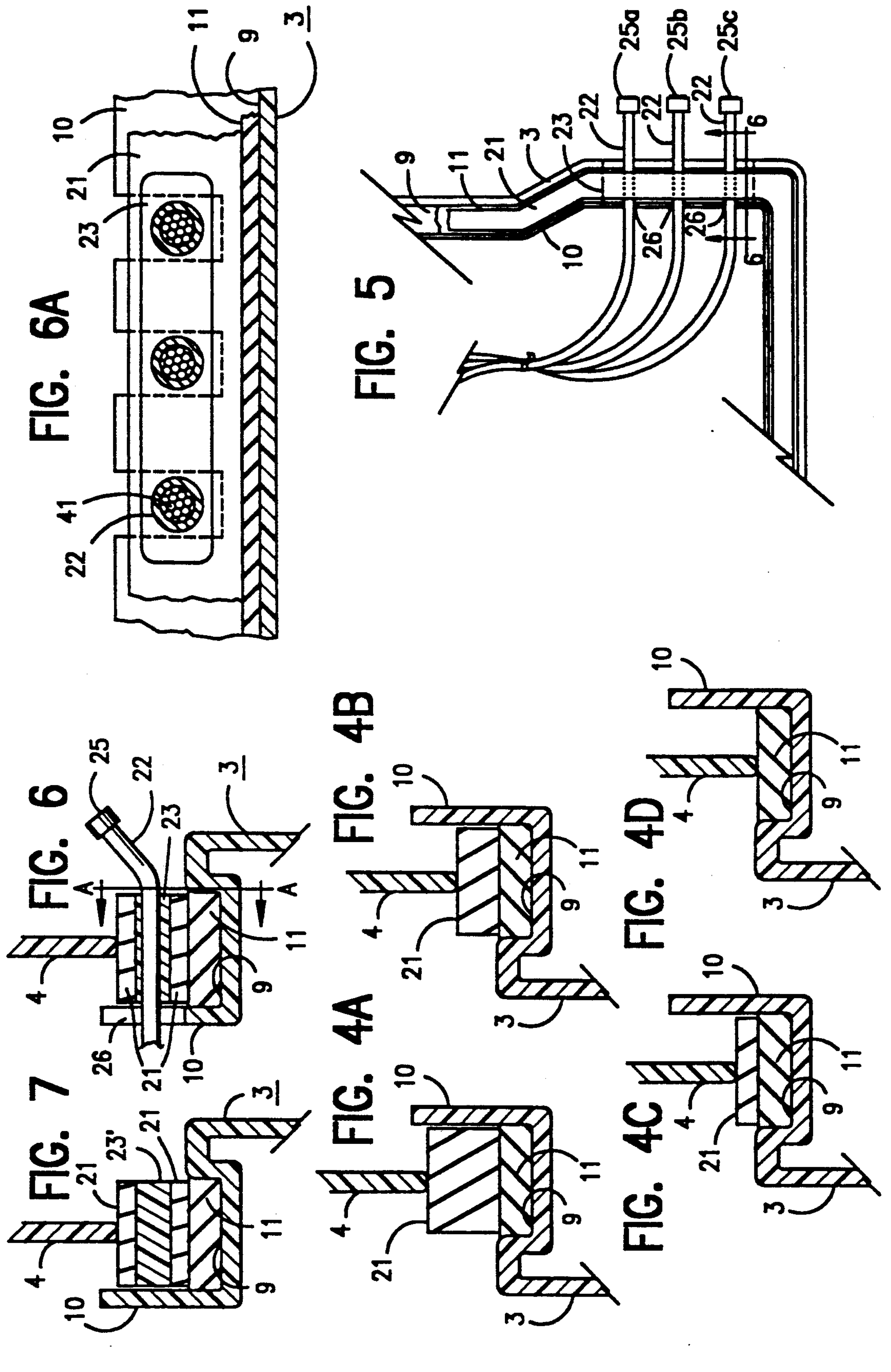
FIGS. 4A through 4D are sections at the section lines A—A through D—D of FIG. 3 and showing in addition a corresponding channel-shaped portion of the deck in which the sealing strips are located in accordance with the preferred embodiment of the invention.
FIG. 5 is an enlarged view of the lower right corner of FIG. 3, showing in addition a portion of the channel-shaped portion of the deck.
FIG. 6 is a section on line 6—6 of FIG. 5.
FIG. 6A is a section on line A—A of FIG. 6 with the hood omitted.
FIG. 7 is a section at the section line 7—7 of FIG. 3 and showing in addition a hood portion and a corresponding channel-shaped portion of the deck in which the sealing strips are located.

In accordance with the preferred embodiment of the invention a removable carburetor adjusting harness structure 20 shown in FIG. 2, and described in detail hereinafter, has a plurality of readily accessible carburetor tuning control knobs 25 which are seen in FIGS. 1, 5 and 6 to be located generally beneath the controls 7 at the forward end of the tray area 5 and near or just rearwardly outside of the interface between the left rear corner of the hood 4 and deck portion 3.

Figure 3:
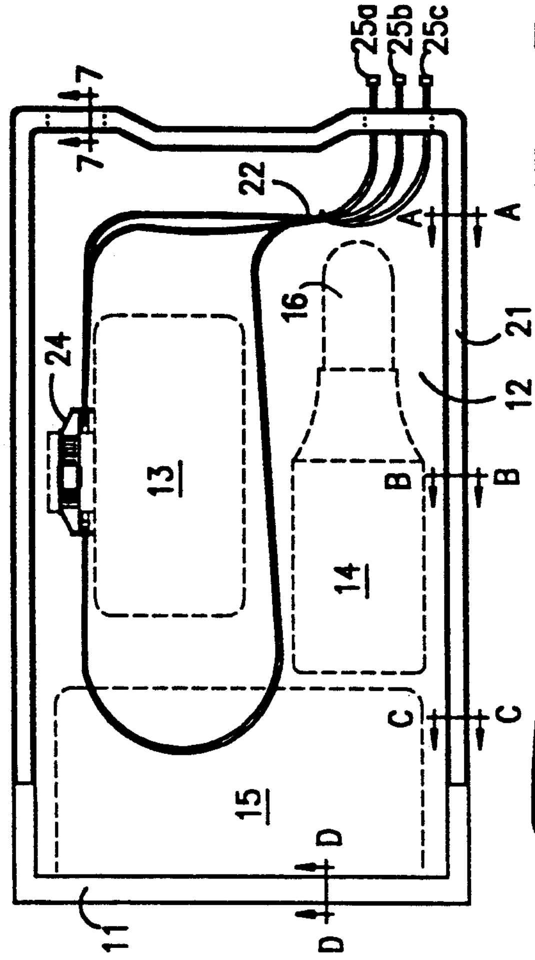
FIG. 3 is a plan view of the harness of FIG. 2 with its U-shaped sealing strip shown on top of a generally rectangular sealing strip which is the conventional seal around the engine compartment opening between the hood and the deck, other parts of the watercraft being omitted except for dotted line indication of some engine compartment components.

The hood 4 is shaped like an inverted generally rectangular tub having a generally rectangular peripheral lower edge which is normally clamped by any suitable conventional means, such as releasable resilient clamping straps 8 shown in FIG. 1, in sealed relationship with a sealing means on the deck 3 around the engine compartment opening. As will be seen in connection with the description of FIGS. 3-7, the sealing means which is a conventional part of the craft is secured to the deck around the rectangular engine compartment opening in an upwardly open channel 9 having at its inner side an upwardly or vertically extending deck flange 10. The outside of the channel 9 is formed by means of a reversely bent portion of the deck 3. The sealing means is in the form of a flat conventional sealing and cushion strip 11 encircling the engine compartment opening 12 which corresponds in shape to the inside of the strip 11 in FIG. 3. In FIG. 3 the dotted lines in the engine compartment opening diagrammatically represent conventional engine compartment components such as engine carburetor structure 13, engine 14 and fuel tank 15.

This invention solves a serious problem with a watercraft of the type shown in FIG. 1 which has its lower front corner 4' of the hood only about two inches above the waterline, and tuning with the hood 4 removed risks having water entering the engine compartment when there is any wave action or tilting of the watercraft during tuning. Tuning must be performed in a body of water because of the requirement for water cooling of the engine during its operation.

Figure 2:
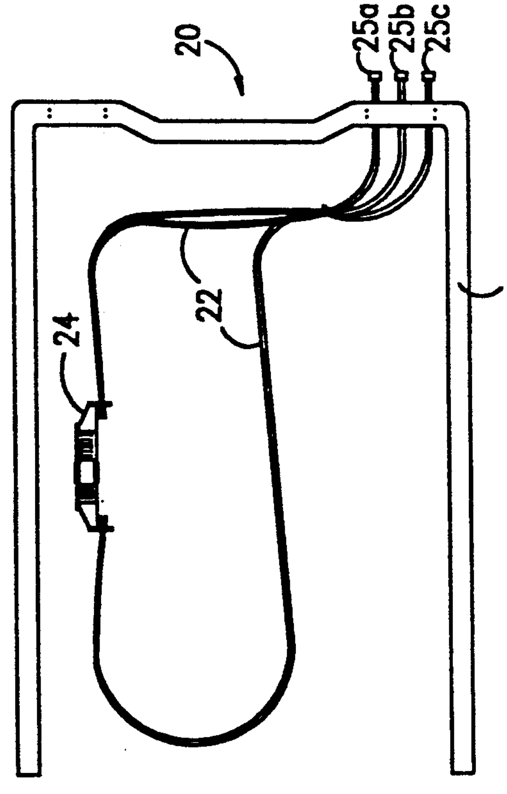
FIG. 2 is a plan view of the preferred embodiment of a carburetor-adjusting harness accessory having a long U-shaped sealing strip to be mounted between the hood and deck of the watercraft of FIG. 1.

The preferred embodiment of the invention provides a carburetor adjustment means in the form of the harness structure 20 seen in FIG. 2 and comprising additional sealing means in the form of a generally flat strip 21 of resilient sealing material. The strip 21 is U-shaped as seen in FIG. 2 and lies atop the strip 11 across the rear and along major portions of the sides of the strip 11 as seen in FIG. 3. The harness 20 includes a plurality of carburetor-adjusting coaxial control cable structures 22 each having one end passing through a rigid plastic block 23 (see FIGS. 6 and 6A) . These ends extend parallel to one another and are mutually closely located in the block 23 which is embedded in the strip 21 at the left side of the harness. The block 23 physically protects the cable sheath or casing therein against being deformably squeezed when the harness is clamped between the hood 4 and the deck 3. A similar imperforate block 23' is symmetrically located in the strip at the right side of the harness to help keep the hood 4 uniformly spaced above the deck 3 across the rearward and horizontally extending cross portion of the U-shaped harness. The second or other end of each coaxial cable structure 22 is secured to a carburetor-attaching bracket 24 for anchoring it in fixed relationship to the carburetor structure 13.

Each of the three coaxial cable structures 22 comprises an outer casing or sheath through which passes a slidable and rotatable flexible inner shaft member 41 extending beyond both ends of the casing. One of the control knobs 25 is adhesively secured to the outer or first end of each respective inner shaft member 41. Each knob is cup-shaped to cover the outer end of the casing of the respective cable 22 and is spaced therefrom to permit slight axial sliding movement of the inner shaft within the casing. As seen in FIGS. 2, 3 and 5 the control knobs 25 of FIG. 1 are mutually closely located and designated 25*a*, 25*b* and 25*c* for three respective coaxial cables 22*a*, 22*b* and 22*c*, respectively. The knobs are closely located to each other at a readily accessible location at the exterior of the engine compartment 12 to facilitate carburetor tuning with one hand of the operator during operation of the watercraft. As shown the control knobs are positioned for convenient operation by the left hand of the user. The conventional throttle control at the handlebars is operated by the right hand of the operator. However, by simply reversing the positions of blocks 23 and 23', as by inverting the strip 21, and reshaping the control cable casings, the control knobs 25 can be located at the right side of the harness for right hand operation.

As seen in FIGS. 6 and 7 the transverse rear side of the U-shaped sealing strip 21 is of uniform thickness, whereas FIGS. 4A–4C show how the side portions of strip 21 taper uniformly in thickness toward their free ends. This tapering and the resiliency of strips 11 and 21 allow the lower edge of hood 4 to be uniformly and completely sealed to the deck 3 around the engine compartment opening when the strip is placed atop the seal 11 and the hood clamped on top of the strip 21 in engagement with strip 21 and the forward portion of strip 11.

The ends of the control cables 22 within the engine compartment 12 are anchored by means of an all stainless steel attaching bracket 24 to the carburetor structure 13. Intermediate portions of these cable structures 22 within the engine compartment may be tied together for mutual support where they cross or are adjacent each other by plastic cable ties. The carburetor structure 13 is attached in a conventional manner (not illustrated) to the watercraft engine and has in the representative illustrations a needle valve carrying portion 13*a* and a fuel pump portion 13*b* having a cylindrical outer surface. The configuration of the bracket 24 of the preferred embodiment has two bracket portions on essentially diametrically opposite sides of the cylindrical fuel pump 13*b* which are clamped to the pump by means of a clamping band or strap 30 having a conventional screw-type tightening mechanism 31 like that commonly found on hose clamp assemblies.

The portion of the carburetor bracket 24 at the left side of the pump 13*b* as seen in FIGS. 8–11 comprises a flange 35 which overlies the carburetor portion 13*a* and has anchored therein the ends of cables 22*a* and 22*c* as seen in FIG. 8. Flange 35 is secured by means of a web part 35W which is in turn secured to a curved flange part 37 anchored to the outer surface of the clamp strap 30 and conforming to the curvature of the wall of the pump 13*b*. The parts 35, 35W and 37 are reinforced to strengthen the bracket by gusset flanges 36 at opposite ends of the web 35W. A similar mirrored bracket structure comprising the flange 38, web 38W, flange 40 and gusset flanges 39 is secured to the strap 30 at the right of the pump 13*b*. The flange 38 anchors the end of cable 22*b*. The flange parts 37 and 40 are secured to the clamp strap 30 by resistance welding.

Figure 13:
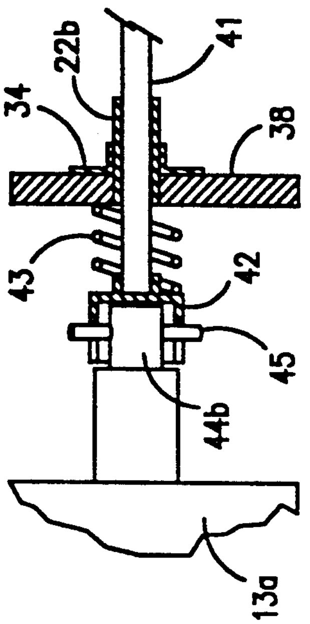
FIG. 13 shows the parts of FIG. 12 in their assembled positions.
Figure 12:
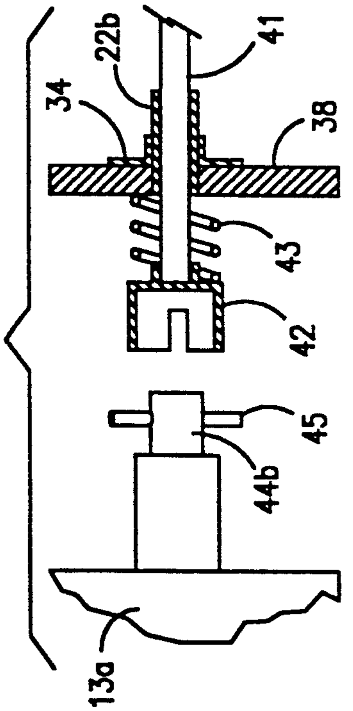
FIG. 12 is a top exploded view of a portion of FIG. 9 showing the relationship of respective adjustable parts of the harness and carburetor structure to be connected during assembly of the harness portion to the carburetor structure.

The carburetor portion 13*a* for the preferred embodiment has three manually adjustable needle valves 44*a*, 44*b* and 44*c* extending therefrom generally in a common plane perpendicular to the axis of the cylindrical fuel pump 13*b*. In their assembled positions, the ends of cables 22*a*, 22*b* and 22*c* are essentially coaxially aligned with the respective needle valves 44*a*, 44*b* and 44*c*. As seen in representative FIGS. 12 and 13 showing the end of cable 22*b* and the respective needle valve 44*b*, each coaxial cable 22 has its inner actuating flexible shaft portion 41 extending beyond the end of the cable casing and carrying a cup-shaped member 42 overlying the end of a respective actuating or adjusting stem of a needle valve 44*b*. Each cup member 42 has axially extending slots which receive the ends of a pin 45 extending through the needle valve stem so that rotation of the inner shaft portion 41 causes corresponding rotation of the needle valve 44. The inner shaft 41 is very flexible, but comprises bidirectionally wound strands to provide a minimum ability to twist relative to its longitudinal axis so that there is relatively no lost motion between the turning of the control knobs 25 and the resulting turning of the respective needle valve engaging cups 42 at the other ends of the shafts 41. This is essential since some factory instructions designate changes in valve settings in increments as small as a sixteenth of a turn. Thus such lost motion could lead to imprecise adjustment and also make it difficult to mark on the knobs the precise settings for optimum tuning for a given set of conditions. The cup member 42 has on the side facing the end of the shaft another cup portion within which the end of the shaft may be adhered. The cup member 42 may be made of plastic or metal. A metal cup facilitates securing the cup to the end of the shaft 41 by crimping the cup member 42 thereto.

Figure 13A:
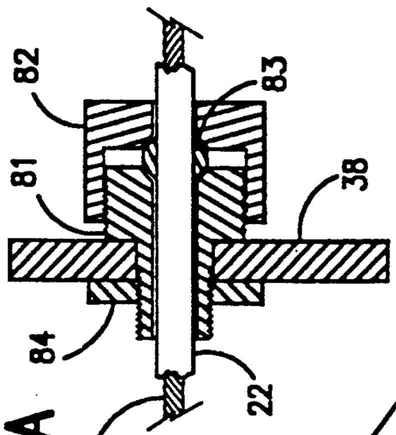
FIG. 13A is a view similar to FIG. 13, but illustrating the modified way of attaching coaxial control cable structures to a carburetor bracket.

The casing of each cable 22 is anchored relative to the supporting bracket 24 by means of a through-panel connector structure such as that shown in FIGS. 13 or 13A. For one anchoring embodiment, as seen in FIG. 13A, the cable 22 is readily removably secured to the flange 38 by means of a conventional bulkhead-type connector having a headed sleeve portion 81 through which the cable 22 extends. The cable is securely held by an annular member 83 which is squeezed thereabout by the camming action of a collar 82 threaded onto the head of the sleeve portion 81. The sleeve portion 81 extends through a hole in the flange 38 and is fixed therein by a nut 84 threaded on the sleeve 81. In FIG. 13 an alternative anchoring structure is provided by a metal ferrule 34 having a cylindrical portion crimped, adhered or otherwise secured to the casing of cable 22b and a flange portion adhered, brazed or otherwise secured to the flange 38 of the bracket 24. The preferred and most versatile anchoring structure is a through-panel or bulkhead-type connector shown at 80 at the left portion of an alternative carburetor structure in FIG. 25 and described hereinafter.

Figure 15:
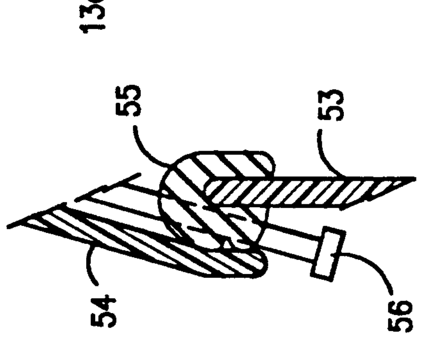
FIG. 15 is a section on line 15—15 of FIG. 14.
Figure 14:
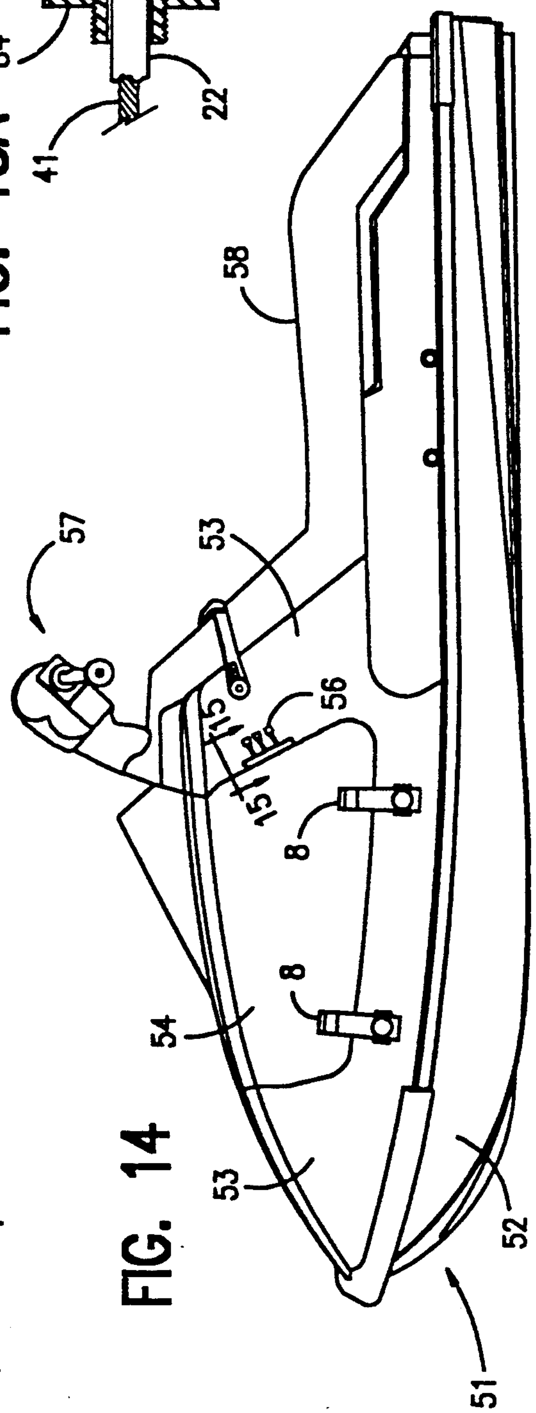
FIG. 14 is a side view of a different watercraft in accordance with an alternative embodiment of the invention showing the location of exterior manual carburetor-adjusting controls relative to the deck and engine compartment hood.

Another embodiment of the invention is shown in FIGS. 14 and 15 wherein the jet-propelled personal watercraft 51, having a lower hull portion 52 and an upper deck portion 53 of the hull, has a hood 54 with a different configuration. In this embodiment the seal between the deck 53 and the hood 54 where the control cables 56 pass therebetween extends generally vertically. The hood 54 is clamped downwardly against the deck 53 by means of clamp straps 8 and exerts an inward generally horizontal component of force toward the deck at the location of the cables which pass through the sealing gasket 55 as shown in the section in FIG. 15. If necessary, more room between the deck and hood 54 can be provided for the control cables 56 by means of notches in the edge of the portion of the deck 53 shown in FIG. 15. When the harness of this embodiment is made removable and cables 55 and the seal portion 55, which extends slightly above and below the cables as seen in FIG. 15, are removed, they are replaced by a seal portion similar in shape to the removed part 55 to keep the seal around the edge of the hood 54 intact. In this embodiment the harness does not have the long sealing strip extensions beyond the cable structures like the strip 21 as previously described.

The harness of this embodiment of FIGS. 14 and 15 is provided with a carburetor bracket like the bracket 24 for adjustment of a carburetor as previously described and the cables 56 are similarly formed and shaped to avoid contact with hot engine parts within the engine compartment under the hood 54. The watercraft 51 has a centrally located adjustable handle bar and control assembly 57 and a long padded riding seat tray 58 which the occupants sit on or straddle while standing during operation of the craft.

Further embodiments of the invention are shown in FIGS. 16 through 19.

Figures 16, 17, 18A, 18B, 18C, 18D, 18E, 18F, 19:
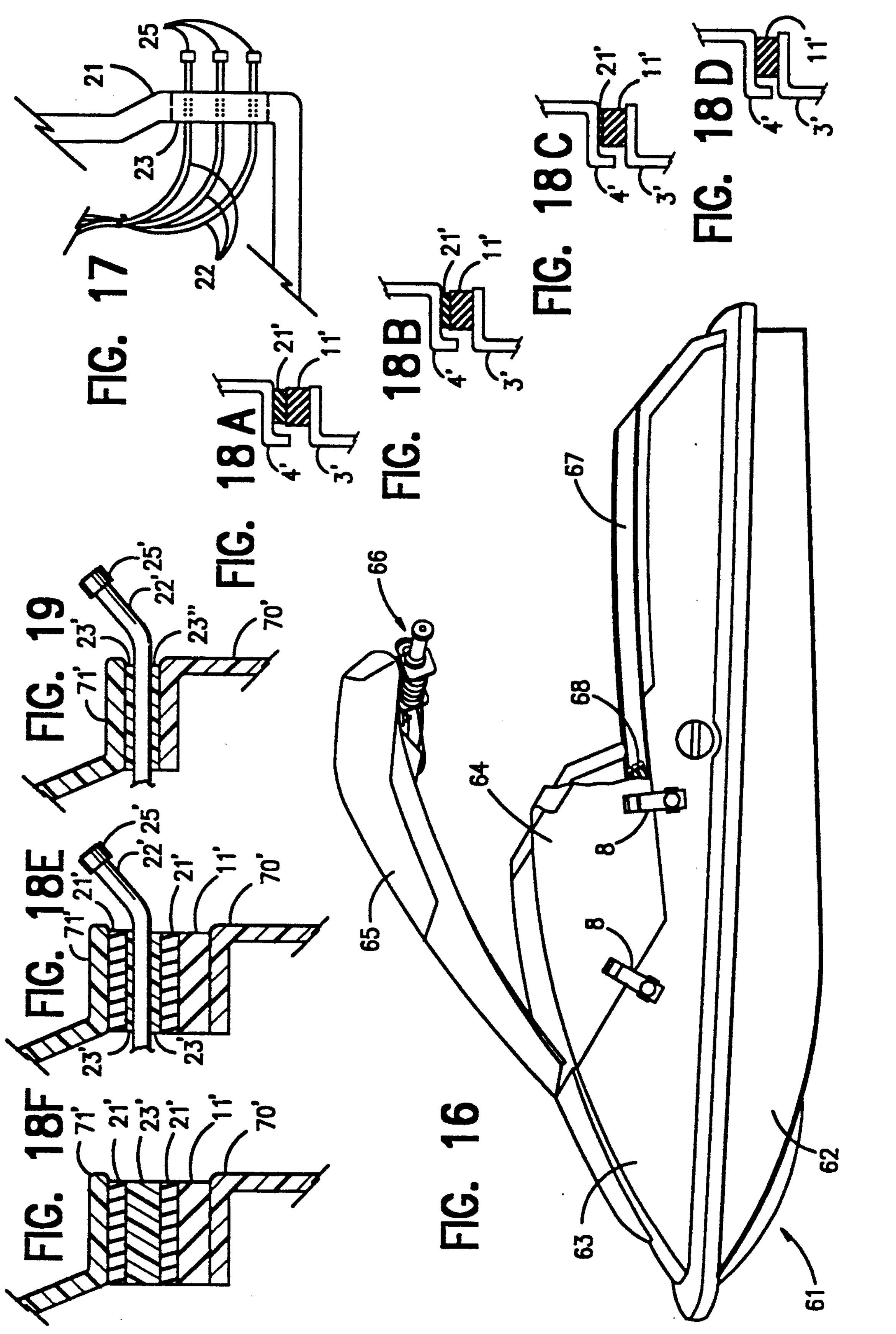
FIG. 16 is a side view of another different watercraft in accordance with another alternative embodiment of the invention showing the location of exterior manual carburetor-adjusting controls relative to the deck and engine compartment hood.
FIG. 17 is an enlarged view of the lower right corner of FIG. 3.
FIGS. 18A through 18F are sections similar to FIGS. 4A-4D, 6 and 7, respectively, of an alternative embodiment of the invention.
FIG. 19 is a section similar to FIGS. 6 and 18 E of still another embodiment of the invention.

Another configuration of personal jet-propelled watercraft 61 is shown in FIG. 16 having a lower hull portion 62 and an upper deck portion 63 of the hull. The engine compartment is covered by a removable hood 64 which is clamped to the deck 63 by clamp straps 8. A steering and control pole 65, vertically pivoted on the deck 63 just ahead of the hood 64, is provided with conventional steering and engine controls 66 for an operator who rides in the tray 67. The control cables 68 of this embodiment are secured in a horizontally extending interface between the hood 64 and the deck 63 in a sealed structure like the cables 22 of FIGS. 2, 3 and 17 of the preferred embodiment. However the harness, which is similar to that of the preferred embodiment has its sealing strip, like strip 21, tapered in thickness and configured during installation to match the shape of the hood-deck interface which is generally horizontal over the rear half of the hood and is upwardly and forwardly inclined under the front half of the hood.

The harness of this embodiment of FIG. 16 is provided with a carburetor bracket like the bracket 24 for adjustment of a carburetor as previously described and the cables 68 are similarly formed and shaped to avoid contact with hot engine parts within the engine compartment under the hood 64.

For stock Kawasaki model 650SX watercraft similar to that shown in FIG. 16, the hood-deck sealing arrangement at the left rear of the hood has a vertical section similar to that shown in FIG. 26. To mount a control harness with coaxial cables extending horizontally straight through this type of sealed hood-deck interface requires cutting away part of the hood and deck components. FIG. 20 shows the hood having an outer shell 64 and an inner portion 64a secured thereto. The hood part 64a has along its lower edge a downwardly open channel with sides which are arranged to straddle the upwardly extending flange of the deck 63. Resilient sealing strip members 69a and 69b on the deck and in the hood channel are pressed into engagement when the hood is clamped to the deck.

To avoid cutting into the hood and deck structures of the model 650SX, it is practical to mount the control end of a harness structure on the top of the hood with cables 22 extending into the engine compartment through a circular access opening 85 as seen in FIGS. 21–23. This opening 85 is large enough to allow reaching into the engine compartment but does not provide practical access for carburetor tuning without use of the present invention. It is normally closed by a plate (not shown) supported at the edge of the opening and sealed to the hood by an annular sealing strip 86. The opening is in a channel portion 87 of the hood which is directly under the pole 65 seen in FIG. 16.

The two control cables 22 of FIGS. 21 and 23 are adhesively secured to the block 23 as previously described, but in this instance no seal is needed around the block and it is fastened to the surface of the channel 87 just to the rear of the opening 85 by means of quick-detachable hook-and-loop (Velcro) strips 88 shown in FIG. 23.

In FIGS. 23–25 the two coaxial control cables are shown in the engine compartment anchored to one side of a carburetor structure 13' having a needle valve adjusting portion 13a', with two needle valves, and a fuel pump 13b' arranged side by side. Bolted to the outer surface of the fuel pump 13b' is a flat flange 97 having at its outer end a perpendicular flange 98 having a slotted edge extending toward the carburetor structure 13' and overlying the side of the needle valve portion 13a'. The control cables 22 are each anchored at their carburetor ends to the flange 98 by means of bulkhead connectors 80 shown in detail in FIG. 25. The connector 80 grips the cable casing by tightly screwing the collar 82 on the part 81' to squeeze the annular member 83 against the casing. This connector differs from that of FIG. 13A by having two nuts 84 and 84' which secure it to the flange 98. To keep the position of the end of each casing fixed relative to the flange 98 when the cable is removed and remounted, the nut 84 may be brazed to the part 81' even with the end thereof and the connector as seen in FIG. 25 may be removed by loosening the nut 84' sufficiently to allow the connector to slide out of the slot 99 toward the carburetor structure as seen in FIG. 24. Remounting is effected by reversing this process.

The needle valves 91 of the embodiment of FIGS. 23–25 are located within cylindrical members 93 projecting from the carburetor portion 13a'. Each needle valve 91 has a splined head 92 with a screwdriver slot in the end thereof. A tubular nylon plastic sleeve 94 is adhesively secured to the end of the flexible shaft 41 and projects therefrom to be tightly slipped over the splined head 92 of the needle valve 91 to rotate the latter when the shaft 41 is turned. The sleeve 94 and the end of the shaft 41 are continuously biased toward the needle valve 91 by means of a compression coil spring 89 encircling the shaft 41 between two plastic washers 90 which transfer forces from the spring 89 against the sleeve 94 and the nut 84 to push the sleeve toward the needle valve.

The needle valve 91 is kept from vibrating and changing its adjusted position within the needle valve housing by a compression coil spring 100 between the housing and a washer 101 under the enlarged head 92 of the valve screw 91.

FIGS. 18A Through 18D illustrate other embodiments of the invention and prime notations are used on numbers for parts which are similar to some previously described parts. The deck 3' and the hood 4' have horizontally opposed flanges at their interface. The permanent seal 11' and the removable seal strip 21' forming part of the carburetor-adjusting harness are clamped between the flanges. FIGS. 18A through 18D are sections of an alternative structure (not illustrated) corresponding to FIGS. 4A through 4D of the preferred embodiment.

FIGS. 18E and 18F are sections through an alternative embodiment (not illustrated) having a deck portion 70' and a hood portion 71', each with horizontally extending opposed flange surfaces at the deck-hood interface and illustrating the retention of harness portions therebetween corresponding to the harness portions in FIGS. 6 and 7, respectively. Corresponding parts have the same numbers with a prime notation.

FIG. 19 is a section similar to FIGS. 18E and 6, but illustrating that the cables like cable 22' may be permanently secured to the deck 70' within the thickness of the conventional seal 23'' between the deck 70' and the hood 71'.

There are a variety of stock and aftermarket carburetors available for engines of personal jet-propelled watercraft. Most carburetors have at least two adjustable needle valves for tuning, but many have three such valves. The three-valve Mikuni model 44 carburetor for which the preferred embodiment of this invention is particularly applicable has a high speed control of four-turn range corresponding to valve 44*a*, a low speed control of three-turn range corresponding to valve 44*b* and a pilot screw of three-turn range corresponding to valve 44*c*. The same harness may also be used on two-valve Mikuni or Keihin model 38 carburetors which is similar to the model 44, but omits the pilot needle valve. In such case the cable 22*a* could be removed or merely kept in place, though inoperative. In other words the three-cable harness may be interchangeably moved and used on a watercraft with a Mikuni 44 carburetor or a similar watercraft with a Mikuni 38 carburetor.

Information relating to the procedure for tuning a Mikuni model 44 carburetor is found in Tuning the Mikuni 44, pp. 52–53, Jet Skier Magazine, Spring 1991, and on pages 69–70 of an article in Personal Watercraft Illustrated, December 1991.

In the personal watercraft illustrated in FIGS. 1, 14 and 16, the craft correspond generally in structure to well known commercially available Kawasaki personal jet-propelled watercraft models 550SX, X-2 and 650SX, respectively. Also, the watercraft of FIG. 1 is generally similar to the craft shown in U.S. Pat. Nos. 4,628,852 and 4,743,213 as far as the deck, hood and engine compartment are concerned, and the watercraft of FIG. 14 is similar in external configuration to the craft of U.S. Pat. No. 4,644,891.

A suitable material for the casing of the control cables is tubing which is commercially sold for use in conjunction with air brakes on vehicles such as trucks. "Weatherhead" brand model NT 100 "Nylon" 11 is such a semi-rigid tubing having a nominal outer diameter of 0.375 in. (.95 cm.) and a wall thickness of 0.062 in. (.16 cm). This tubing is constructed with a nylon core, a polyamide fiber braid and a nylon jacket. At normal ambient temperatures this tubing is semi-rigid, but when heated with boiling water to approximately 100° C. becomes flexible enough to be readily formed to any appropriate shape. If held in such shape while cooling back to ambient temperature, the tubing returns to its semi rigid state and will "set" to retain such shape as long as it is kept any normal ambient temperature encountered in -engine compartments during normal operation of personal jet-propelled watercraft.

For the flexible shafts 41 a suitable flexible non-twisting stainless steel shaft of 3/16 inch outside diameter is available from the STOW Manufacturing Company, Binghamton N.Y., which makes such shafts for use in power drive and/or remote control applications.

The adhesive used for the adhesive bonds, whether plastic-to-plastic, plastic-to-metal or metal-to-metal may be 3M DP-190, which is a gray material resulting from a 1 to 1 mix ratio of Scotch-Weld Epoxy Adhesive 2216 which has good peel, cleavage, shock and environmental aging resistance. It has a worklife of 90 minutes, average T-peel of 20 pounds per inch width and 2,200 psi. overlap shear strength, all at 75 degrees F.

While the present invention has been described in relation to personal watercraft, landcraft such as snowmobiles utilize similar carburetors and engines and may also encounter similar tuning problems due to use at varying elevations, at varying temperatures and/or variations in fuel. The present invention is applicable to tuning problems which may be encountered with such vehicles.

Other variations within the scope of this invention will be apparent from the described embodiment and it is intended that the present descriptions be illustrative of the inventive features encompassed by the appended claims.

What is claimed is:

1. A readily attachable and detachable carburetor-adjusting fine tuning control harness for use with a vehicle having a carburetor with operator controlled throttle and at least one adjustable needle valve for fine tuning, the vehicle having a deck comprising a stationary portion and a removable hood portion which covers an engine compartment opening, said deck having an interface between the hood and the stationary deck portion at the periphery of the opening, the harness having at least one coaxial structure comprising an outer casing and an inner flexible rotatable but essentially n on-twistable shaft, one end of the casing of each coaxial structure having a releasable mounting means to secure each such end in fixed relationship to the deck at the outside of the compartment when the compartment is closed by the hood, the inner shaft of each said structure extending throughout the length of the respective casing and having ends beyond the ends of the casing, one end of each shaft being manually accessible and extending beyond said one end of the casing and having a manually adjustable knob thereon for rotating the shaft within the casing, each said shaft having a carburetor needle valve adjusting member on its other end beyond but near the other end of the casing, anchoring means for releasably securing that other end of each casing in a fixed position relative to a carburetor structure for an engine in said compartment to hold each said carburetor needle valve adjusting member in operative engagement with a respective carburetor-adjusting needle valve to adjust the valve by rotation of the knob at the opposite end of the shaft, the releasable mounting means and said anchoring means enabling separable release of said control harness as a unit relative to said deck and said carburetor structure.

2. A carburetor-adjusting control harness according to claim 1 wherein each said casing is a relatively rigid self-supporting structure and is configured to fit appropriately within the engine compartment so as to be readily removable.

3. A carburetor-adjusting control harness according to claim 2 wherein each said casing is deformable when heated to a temperature above the environmental temperature to which it is normally exposed in an engine compartment and again becomes rigid when cooled to said environmental temperature so that the shape of the casing may be configured by heating, shaping and cooling it to fit appropriately within the engine compartment.

4. A carburetor-adjusting control harness according to claim 3 wherein each said casing is deformable at the heated temperature of boiling water.

5. A carburetor-adjusting control harness according to claim 4 wherein said mounting means includes a protective rigid member within which the casing is secured to prevent it from being deformably pinched when the mounting means is secured to the deck.

6. A carburetor-adjusting control harness according to claim 1 wherein said anchoring means includes bracket means which can be anchored to the carburetor structure and supports each casing in said fixed position relative to the carburetor structure, said anchoring means providing means to enable separation of each such casing from the carburetor structure to permit removal of the harness from the engine compartment.

7. A carburetor-adjusting control harness according to claim 6 wherein said bracket means is fixed to each such casing and that casing is readily removable from and replaceable in said fixed position relative to the carburetor structure by detaching and attaching the bracket means relative to the carburetor structure and correspondingly detaching or attaching said mounting means for the other end of the casing at said deck.

8. A carburetor-adjusting control harness according to claim 6 wherein said bracket means includes a detachable connection means between the bracket mans and the casing whereby the casing is readily removable from and replaceable in said fixed position relative to the carburetor structure by detaching and attaching it relative to the bracket means at said detachable connection means and correspondingly detaching or attaching said mounting means for the other end of the casing at said deck.

9. A carburetor-adjusting control harness according to claim 7 including strap means attached to said bracket means whereby the strap means may be secured around a portion of the carburetor structure to securely anchor the bracket means relative to the carburetor structure.

10. A carburetor-adjusting control harness according to claim 6 for use with a carburetor structure having a needle valve adjusting portion located in fixed side-by-side relationship to a fuel pump, said bracket means having means for attaching it to the fuel pump and including a bracket portion, for each such casing, overlying a respective said carburetor needle valve adjusting portion, the casing being secured to such bracket portion.

11. A carburetor-adjusting control harness according to claim 1 wherein the hood has a top horizontally extending surface with an access opening therein, said mounting means including means for its securement to the outer surface of the hood adjacent the access opening.

12. A carburetor-adjusting control harness according to claim 11 wherein said mounting means includes quick-releasable means for attachment to the hood surface.

13. A readily removable carburetor-adjusting control harness for use with a jet-propelled personal watercraft, the watercraft having a deck with an engine compartment opening and a hood in sealed engagement with the deck at the periphery of the engine compartment opening to prevent entry of water into the compartment, the harness having at least one coaxial structure comprising an outer casing and an inner flexible rotatable but essentially non-twistable shaft, one end of the casing of each coaxial structure having sealing means to provide a sealed relationship when inserted between the hood and said deck with that one end extending to the outside of the compartment when the compartment is closed by the hood, the inner shaft of each said structure extending throughout the length of the respective casing and beyond the ends of the casing, each shaft having a manually accessible end extending beyond said one end of the casing and having a manually adjustable knob thereon for rotating the shaft within the casing, each said shaft having a carburetor adjusting member on its other end beyond but near the other end of the casing, a bracket structure for releasably anchoring that other end of each casing relative to a carburetor structure for an engine in said compartment to hold each said carburetor adjusting member in engagement with a respective carburetor-adjusting needle valve to adjust the valve by rotation of a respective manually adjustable knob.

14. A readily removable carburetor-adjusting control harness according to claim 13 wherein said sealing means includes an elongated U-shaped strip to the positioned atop the conventional sealing means between the deck and the hood.

15. A readily removable carburetor-adjusting control harness according to claim 13 wherein said bracket structure includes a mounting portion for attaching to a carburetor structure portion which is offset relative to each needle valve, said bracket structure further including flange means extending from the mounting portions and overlying each needle valve for supporting each respective casing.

16. A jet-propelled personal watercraft having an engine compartment in a hull with a top opening for the compartment and a hood engaging the hull at the periphery of the opening and closing the opening with a sealed interface therebetween to prevent entry of water into the compartment, the compartment being ahead of the station typically occupied by the watercraft operator, a resilient sealing strip between the hood and said hull around the periphery of said opening, an engine means in said compartment and including tunable carburetor means therefor having a carburetor structure with at least one needle valve adjustable to tune the carburetor for optimum performance under existing environmental conditions, a readily attachable and detachable carburetor-adjusting control harness accessory, said harness having at least one coaxial structure comprising an outer casing and an inner flexible shaft, means for securely supporting one end of the casing of each said coaxial structure in sealed relationship with both the hood and said hull at said interface with that one end extending to the outside of the compartment when the compartment is closed by the hood, the inner shaft of each said coaxial structure extending throughout the length of the respective casing and beyond the ends of the casing, each shaft having a manually accessible outer and extending beyond said one end of the casing and having a manually adjustable member thereon for rotating the shaft within the casing, each said shaft having a carburetor adjusting member on its other end beyond but near the other end sing, bracket means for anchoring the other end of each casing relative to said carburetor structure in said compartment to hold each said carburetor adjusting member in a carburetor-adjusting position for adjustment of the carburetor by manual adjustment of the respective manually adjustable member at the outer end of the shaft, means for securely clamping said hood to the hull with the means for securely supporting said one end of end of each casing being clamped between the hood and the hull.

17. A jet-propelled personal watercraft according to claim 16 wherein said carburetor-adjusting control harness includes between the hood and the deck a flat U-shaped resilient sealing strip which tapers in thickness along its sides toward the ends of the strip, each said coaxial structure extending transversely through said sealing strip.

18. A jet-propelled personal watercraft according to claim 17 wherein said carburetor means includes three needle valves at spaced locations on a carburetor structure, said carburetor-adjusting control harness including three said coaxial structures, said manually adjustable members, on said shafts being mutually closely located control knobs at the outside of the engine compartment, said carburetor adjusting members on said shafts being coupling means extending from the ends of said shafts for engaging and actuating the three respective needle valves.

19. A jet-propelled personal watercraft according to claim 18 including a rigid protective block in said sealing strip and wherein each casing is protected from being deformably squeezed by passing through said block which is positioned between the hull and the hood.

20. A jet-propelled personal watercraft according to claim 18 including strap means attached to said bracket means whereby the strap means may be secured around a portion of the carburetor structure to securely anchor the bracket means relative to the carburetor structure.

* * * * *